United States Patent
Fillion et al.

(10) Patent No.: US 8,274,533 B2
(45) Date of Patent: Sep. 25, 2012

(54) RESIZING A DIGITAL DOCUMENT IMAGE VIA BACKGROUND CONTENT REMOVAL

(75) Inventors: Claude S. Fillion, Rochester, NY (US); Vishal Monga, Webster, NY (US); Zhigang Fan, Webster, NY (US); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 895 days.

(21) Appl. No.: 12/369,790

(22) Filed: Feb. 12, 2009

(65) Prior Publication Data

US 2010/0201711 A1    Aug. 12, 2010

(51) Int. Cl.
*G09G 5/02* (2006.01)
(52) U.S. Cl. ...................................................... 345/660
(58) Field of Classification Search ................... 345/660
See application file for complete search history.

(56) References Cited

U.S. PATENT DOCUMENTS

| | | | |
|---|---|---|---|
| 6,219,444 B1* | 4/2001 | Shashua et al. | 382/154 |
| 6,516,096 B2* | 2/2003 | Yokose et al. | 382/248 |
| 6,670,963 B2* | 12/2003 | Osberger | 345/629 |
| 7,174,050 B2* | 2/2007 | Balmelli et al. | 382/276 |
| 2003/0035917 A1* | 2/2003 | Hyman | 428/67 |
| 2008/0219587 A1* | 9/2008 | Avidan et al. | 382/276 |
| 2008/0267528 A1* | 10/2008 | Avidan et al. | 382/276 |
| 2009/0180713 A1* | 7/2009 | Bucha et al. | 382/300 |
| 2009/0185210 A1* | 7/2009 | Safonov et al. | 358/1.11 |
| 2009/0317020 A1* | 12/2009 | Gerhard et al. | 382/299 |
| 2010/0013827 A1 | 1/2010 | Fillion et al. | |
| 2010/0027876 A1* | 2/2010 | Avidan et al. | 382/162 |
| 2010/0060547 A1* | 3/2010 | Bloebaum et al. | 345/1.3 |
| 2010/0142853 A1* | 6/2010 | Fillion et al. | 382/298 |
| 2010/0328352 A1* | 12/2010 | Shamir et al. | 345/661 |

OTHER PUBLICATIONS

Seam carving for media retargeting Ariel Shamir, Shai Avidan Jan. 2009 Communications of the ACM, vol. 52 Issue 1.*
Seam carving for content-aware image resizing Shai Avidan, Ariel Shamir Aug. 2007 SIGGRAPH '07: SIGGRAPH 2007 papers.*
Improved seam carving for video retargeting Michael Rubinstein, Ariel Shamir, Shai Avidan Aug. 2008 SIGGRAPH '08: SIGGRAPH 2008 papers.*
U.S. Appl. No. 12/174,767, filed Jul. 17, 2008, Fillion et al.
Avidan, et al., "Seam Carving for Content-Aware Image Resizing," *ACM Transactions on Graphics (TOG)*, Jul. 2007, 9 pages, vol. 26, Issue 3, ISSN: 0730-0301.

* cited by examiner

*Primary Examiner* — Javid A Amini
(74) *Attorney, Agent, or Firm* — Philip E. Blair; Fleit Gibbons Gutman Bongini & Bianco P.L.

(57) ABSTRACT

What is disclosed is a system and method for performing a background deletion that exploits both local and global context to remove background and other white space between objects with the aim of retaining structural relationships between objects in the document. A document image is received and seams are carved through the image. Seams composed of uniform background pixels are identified. Adjacent seams containing background pixels are collected into groups of seams. The background seam groups are classified according to their widths. A target number of seams to be removed for each background seam group is then determined based on the classification. Seam groups which are wider will have at least the same or a greater target number of seams to be deleted therefrom than will seam groups of narrower widths. The document image is then resized by deleting seams from the seam groups based on the assigned target number.

18 Claims, 10 Drawing Sheets

RESIZING A DIGITAL DOCUMENT IMAGE VIA BACKGROUND CONTENT REMOVAL

TECHNICAL FIELD

The present invention is directed to systems and methods which perform a resizing operation on a digital image of a document in an image processing or document reproduction system.

BACKGROUND

Digital documents often need to be resized to fit the display whereon the document image is intended to be shown to the user, such as mobile phones displays, camera and video displays, PDAs, and the like. Document images can be resized by a cropping or scaling technique. Cropping works reasonably well for shrinking images if there is only one region of interest in the document. Scaling works reasonably well for shrinking images containing low frequency information. However, scaling can be of limited value because scaling tends to be uniformly applied to the image resulting in information loss. With proper region identification, cropping may be preferred over naïve scaling. Naïve cropping can be problematic because important contextual information may be removed from of the document.

Document resizing is a non-trivial process that involves a trade-off between many parameters such as efficiency, smoothness, and sharpness. As the size of a document is increased, the pixels which comprise the image become increasingly visible and distort the content. Enlarging an image is less common because it may not be possible to discover any more information during the resizing operation to put into the image than which already exists and image quality of the end product may suffer as a result. Content aware image resizing can yield more pleasing results, especially when an image needs to be anamorphically resized. However, existing methods such as naive removal of content have limitations that can lead to undesirable artifacts such as uneven spacing of text.

Images of documents tend to be different from pictorial images. The former tend to contain various objects such as text, pictures, graphics, and the like, arrayed over a background which includes white space and other uniformly colored areas. Pixels in uniform background regions make excellent candidates for removal as their removal tends to introduce fewer changes in the document content. However, naively removing pieces of background from the document can impact the document's visual balance and proportionality.

Accordingly, what is needed in this art are increasingly sophisticated systems and methods for resizing documents which adaptively remove background content from a document while effectively maintaining an overall visual balance of the background of the document.

BRIEF SUMMARY

What is provided are a novel system, method, and computer program product for resizing documents which adaptively removes background content from a document while effectively maintaining an overall visual balance of the background of the document. The present method performs a background deletion that exploits both local and global context to remove background and other white space between objects with the aim of retaining structural relationships and other information which impact overall visual quality of the document. The present method provides algorithms with slightly different parameters for vertical and horizontal resizing. For each direction, a common procedure is applied that is composed generally of: importance map construction; seam generation and seam energy computation; background seam group (BSG) identification and creation; BSG classification and target number of seams to be removed for each BSG based on BSG classification; and seam deletion from selected BSGs based on the assigned target number. Through an implementation of the present method, as will be described herein in detail, a better quality output product can be generated when resizing input documents to fit a particular output size. The present method will also find its intended uses in image processing and document preview applications, where the size of the output display is smaller than the size of the input document. Other features, enhancements, and embodiments are also provided.

In one example embodiment, the present method for resizing an image of a document in an image processing system involves the following. An image of a document to be resized is received. The document image has a plurality of pixels. An importance map is generated for the image using one or more selected image operators. A plurality of seams are carved through the document image from a first edge to a second edge in one of a horizontal and vertical direction using a seam carving technique. Each seam traverses a path through the image. The direction in which seams are carved through the image will depend on the horizontal or vertical axis along which the image is intended to be resized. An energy is computed for each seam based on the importance values of pixels along the seam path. Seams are identified which are composed of uniform background pixels based on seam energy. Once the seams have been carved, adjoining seams are grouped together to form background seam groups. The location of the background seam groups assists in classification. Background seam groups comprised of seams within the margins of the document page are identified as page margin groups. Seams are deleted first from the page margin groups in an effort to achieve the desired target dimensions. If the target dimension has not been achieved then a target number of seams to be removed from each of the background seam groups required to achieve the desired target dimension is determined. Background seam groups having wider widths will have at least the same or a larger number of seams removed from their respective seam groups than will background seam groups of narrower widths. Seam groups retain their ordering by width. If a seam group is wider than another seam group before resizing, it will remain wider or at least will not be any narrower than the next smaller seam group after resizing. The document image is then resized by deleting seams from the background seam groups based on their respective determined target number of seams to be removed. Thereafter, the resized document image is provided to an image output device. In such a manner, an overall visual balance of the background of the document image is maintained. Embodiments are provided which are specific to vertical and horizontal resizing including methods for calculating whether a sufficient number of seams can be removed from the image to achieve a desired target output dimension in the vertical and/or horizontal direction.

Other features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
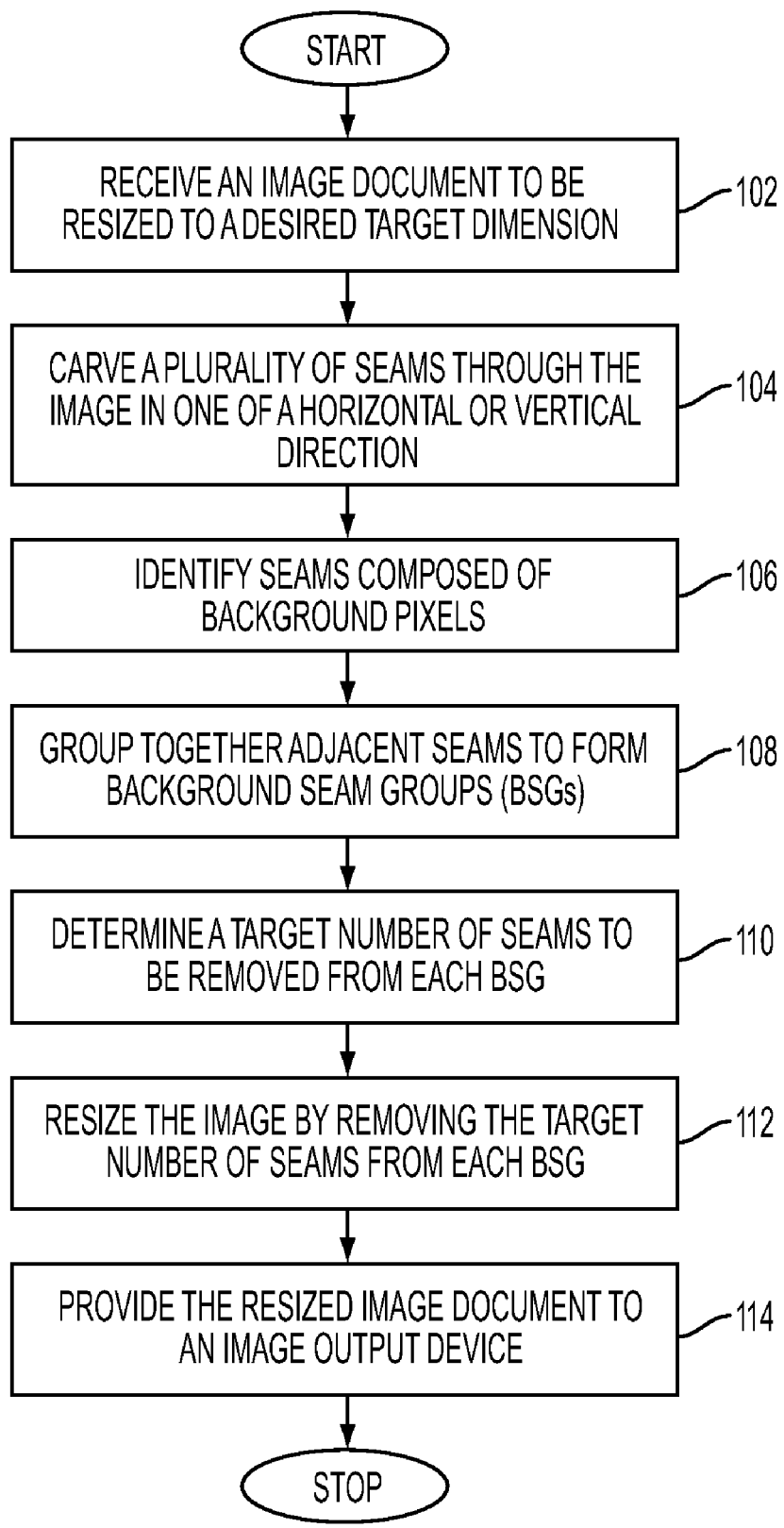
FIG. 1 is a flow diagram of one example embodiment of the present method of resizing a document image in an image processing system.

What is provided are a system and method for resizing documents which adaptively removes background content from a document while effectively maintaining an overall visual balance of the background of the document. The present method performs a background deletion that exploits both local and global context to remove background and other white space between objects with the aim of retaining structural relationships and other information which impact overall visual quality of the document.

It should be understood that one of ordinary skill in this art would be readily familiar with many facets of image processing such as image resizing, image operators, pixel importance values and importance maps for images, seam-carving techniques, and other algorithms and techniques common to the digital image resizing arts. Additionally, one of ordinary skill would be familiar with advanced mathematical techniques, equations, and algorithms common in this art. One of ordinary skill would also be knowledgeable about computer science and software and programming systems and methods sufficient to implement the functionality and capabilities described herein in their own hardware environments without undue experimentation.

A pixel, as used herein, refers to the smallest segment into which a digital image can be divided. Each received pixel has one or more color values associated with it. Pixel values can be gray scale values or coordinates in color space. Pixels of a received image can be converted to a chrominance-luminance space using, for instance, a RBG-to-YCbCr converter to obtain luminance (Y) and chrominance (Cb,Cr) values for each pixel. It should be appreciated that pixels may be represented by values other than YCbCr which can be used by an image operator to determine a pixel importance value.

A "document image" or "image document" is intended to refer to a digital image of a document which has been scanned into digitized form using a document scanner or other document scanning device generally known in the arts. A document image typically contains objects positioned on a background thereof one or more objects. These objects include, for instance, text, pictures, graphics, charts, images, and the like, which are overlaid on a substantially uniform background typically composed of a white space or other uniformly colored background. Importance maps generated from received color pixels of the scanned digital documents can be examined for their respective energies and a determination made as to whether the pixel comprises one of a background or some other object in the document image. Background areas will have a relatively low energy. Background includes white space and is usually a part of the document design and hence generally conforms to certain rules. These rules are understood to be that the width of the space between objects is reflective of a structural relationship among adjacent objects. For example, spacing between neighboring text lines is generally constant within any given paragraph and generally remains the same for paragraphs of the same text style. Spacing between paragraphs is usually larger (or at least not any smaller) than the line spacing. The present method performs a background deletion that exploits both local and global context to remove background spacing with the aim of retaining structural relationships among objects contained within the document as well as text line spacing.

An image processing system, as used herein, refers to any hardware or software system capable of performing a resizing operation in accordance with the present method as described herein. Resizing is understood to mean any of an image reduction or an image enlargement.

An image output device refers to a device capable of reducing a signal of an image to viewable form. The set of such devices includes printers, xerographic devices, image production and photographic equipment, monitors and other display devices, and the like. Outputting the image means communicating information about the image to an image output device. Such communication may take the form of transmitting the image in the form of signals over a network or other communication pathway, or storing the signals to a memory or storage media for subsequent retrieval. A color marking device, such as an inkjet printer, is one example of an image output device which produces an image from the received signal onto a substrate by the visual integration of colored inks deposited thereon.

Reference is now being made to the flow diagram of FIG. 1 which illustrates one example embodiment of the present method of resizing a document image in an image processing system.

At 102, an image of a document to be resized to a target dimension is received. The received source image has a plurality of pixels comprising color data points. Such color data points generally comprise intensity values. Images of documents can be received or otherwise captured in a manner generally known in the arts and pixel values readily obtained therefrom. In one embodiment, the image document is received using a document scanning device which scans the document into digitized form. Scanning produces a digitized image of the document. The digitized image is represented by a plurality of pixel values. The document image to be resized may be captured in a variety of different ways and provided to a color management system wherein the present resizing method has been implemented. The image of the document to be resized may be captured by a digital camera and transferred to the color management system via a USB cable or Bluetooth interface. The document image may be captured via a scanning device and the pixel values transferred to the color management system via a cable or over a network. The document image may be on a light-sensitive substrate such as a color or monochrome negative and read by a transparency input device. The received pixel values of the image can then be transmitted. Pixel values of the digital document image may be read from a memory or retrieved from a storage device such as a floppy disk, CDROM, DVD, hard drive, and the like. Pixel values of the document image can be obtained from a computer program product which may additionally contain machine readable program instructions which cause a processing unit of a computer system to perform one or more aspects of the present resizing method. The document image may be received over a network from a remote source or device whereon the image is stored.

At 104, a plurality of seams are carved through the document image. A seam carving technique is used to carve seams through the image. The seam path starts from a first boundary of the image and traverses the image (horizontally or vertically) to a second boundary of the image. For each seam path carved through the image, an identical path is identified through the generated importance map as will be discussed herein further. Seams typically are of the width of a single pixel. In another embodiment, seams are carved through the image which have widths greater than a single pixel. Generally, all seams carved through the image have the same width. A seam carving algorithm is utilized to carve the seam of connected pixels through the image from a first edge to a second edge. Such a seam carving technique carves a seam by iteratively selecting a next pixel in the seam's path based on pixel importance values (highest or lowest) obtained from the image's importance map. In one example, the seam carving technique iteratively selects the next adjacent pixel by searching for the pixel having a lowest pixel importance value. One seam carving technique is disclosed in: "*Seam Carving for Content-Aware Image Resizing*", Shai Avidan and Ariel Shamir, ACM Transactions On Graphics (TOG), Vol. 26, Issue 3, (July 2007), ISSN: 0730-0301, which is incorporated herein in its entirety by reference. An importance map of the image is a transform of an image which helps to identify one or more Region(s) of Interest (ROIs) in the image. ROIs are areas of an image that were deemed more important than other areas of the image. Typically, these regions were areas of higher energy or areas of great complexity. The importance map is used to identify these regions by a thresholding technique. Methods for determining pixel importance values are known in the arts. The importance values comprising the importance map are individually determined using any of a plurality of image operators selected to be responsive to changes in pixels based on content. The selected image operators are used to determine the importance of a given pixel. Generally, the importance of a given pixel is estimated by the image operator by an amount of contrast a given pixel has with respect to a neighborhood of pixels surrounding that pixel. Example image operators are: gradient operator, probabilistic entropy operator, Laplacian transform, Hough transform, visual saliency, and face detection operator. A discussion as to the features, benefits, and differences of various image operators is beyond the scope of this disclosure. Each image operator brings different characteristics to bear on the calculation of an importance value for any given pixel given the various characteristics of pixels in a neighborhood of surrounding pixels. Different image operators may produce a different importance value for the same pixel. Pixel importance values can be further normalized such that each falls within a defined set of parameters depending on the implementation. The collection of calculated importance values produces the importance map. Importance maps determined using different image operators can be combined to form a hybrid importance map for the image. One example embodiment of generating hybrid importance maps is disclosed in U.S. application Ser. No. 12/174,767 entitled, "*Hybrid Importance Maps for Content Aware Digital Image Resizing*", which is incorporated herein in its entirety by reference. For each seam carved through the source image, an identical seam path is identified through the importance map such that there is a one-to-one relationship between seams carved through the source image and seams through the image's importance map. The seam through the image is composed of pixel values. The identical seam through the importance map is composed of the seam's corresponding pixel importance values.

Once the importance map has been generated for the image and seam paths carved therethrough, an energy is calculated for each seam. In one embodiment, seam energy is the cumulative sum of individual importance values of all pixels in the seam's path through the importance map. This produces an energy value for the seam. Seam energy is generally computed using the importance values of all pixels in the seam. Alternatively, a seam's overall energy is computed using only a subset of importance values in the seam's path through the importance map. The overall energy for a seam may be computed in other ways. Other embodiments for determining the overall energy of a given seam based on the seam's pixel importance values are intended to fall within the scope of the appended claims.

At 106, seams are identified which are composed of background pixels. Such seams would, for example, be comprised of white space or of a uniform colored background. In one embodiment, seam identification is based on the computed seam energy. Seams composed of uniform background pixels generally contain very low seam energy and can be reliably identified. Methods for determining whether a seam is composed of background pixels are known in the arts and are intended to fall within the scope of the appended claims. Background seams represent the removable portion of an image background.

At 108, adjacent seams are grouped together to form seam groups. A group of adjacent seams are referred to as background seam groups (BSGs). The width of the $i^{th}$ background seam group is referenced herein as W[i]. Groups of background seams composed of seams located almost entirely within the page margins of the document are referred to as a Page Margin BSGs. Some seam groups may be of different widths and some seam groups may be of the same width. Seam group W[6] may, for example, be a seam group of 5 seams wide (width=5). Another seam group W[8] may, for example, be a seam group of 5 seams wide (width=5). Multiple seam groups may have the same width. Groups W[1] and W[3] may have, for example, the same width=2. The same number of seams is deleted from groups having the same overall width.

At 110, a target number of seams to be deleted from each of the background seam groups is determined. Seam groups which are wider will have at least the same or a greater target number of seams to be deleted therefrom than will seam groups of narrower widths. In other words, narrower seam groups will have a same or smaller target number of seams to be deleted therefrom than will wider seam groups. In addition, seam groups retain their ordering by width. If a seam group is wider than another seam group before resizing, it will remain wider or at least will not be any narrower than the next smaller seam group after resizing.

At 112, the image is resized by removing the target number of seams from each of their respective seam groups. Removing a seam causes the image to shrink horizontally or vertically by the width of the deleted seam. Removal of a vertical seam shrinks the image in the horizontal direction by the width of the seam removed. Likewise, removal of a horizontal seam shrinks the image in the vertical direction by the width of the seam removed.

At 114, the resized image is communicated to an image output device such as, for example, a printer, copier, display, or storage device.

It should be understood that the above image resizing steps occur in a horizontal and/or a vertical direction as required to resize the image to the desired target dimensions. The image would first be resized in one direction and then the other. Seams can be initially carved through the image in both the horizontal and vertical directions and information about the carved seams stored in a memory unit or storage device. Thereafter, horizontal or vertical seams can be removed in one direction or the other or in an alternating manner until the target dimensions of the resized image have been achieved.

The present method will now be discussed separately with respect to the embodiments of vertical and horizontal resizing.

The present method is based on the following observations for a given document: 1) The spacing between horizontal rows of text in the document tends to be uniform. 2) Horizontal and vertical spacing of objects within the document is generally not uniform. 3) Horizontal gaps between characters and words of text tends to be relatively small and therefore is visually sensitive to changes; therefore these preferably are not subject to deletion. 4) Deletion of white space from within the page margins tends to have little impact on a document's visual structure and content proportionality. Many documents have a minimum margin requirement for printability. Base on the above observations, slightly different parameters are used herein to resize the image in the horizontal and vertical directions.

Vertical Resizing Method

Reference is now being made to FIGS. 2 through 5 which collectively illustrate one example embodiment of a flow diagram of the present resizing method which reduces the size of an image along a vertical axis. Horizontal seams are carved through the image, for example from a right edge to a left edge, and removed in a manner in accordance with the teachings hereof such that the size of the image is reduced along a vertical axis of the image to achieve a desired target dimension.

At 202, an image of a document to be resized in the vertical direction is received. The received image has a plurality of pixels comprising color data values such as intensity. Images of documents can be received or otherwise captured in a manner generally known in the arts.

At 204, an importance map is generated for the image. As previously discussed, the importance map is composed of pixel importance values determined for each pixel of the received image. An image operator is used to determine the importance of a given pixel. The importance of a given pixel is estimated by the image operator by an amount of contrast a pixel has with respect to a neighborhood of pixels surrounding that pixel. An importance value for that pixel is the result of that estimation. The importance map for the image is composed of the collection of individual pixel importance values.

At 206, a plurality of horizontal seams are carved through the received image. A seam carving technique is used to carve seams through the image. For vertical resizing, seams are carved through the image horizontally. The seam path starts from a first boundary of the image and traverses the image (horizontally) to a second boundary. For each seam path carved through the image, an identical path is identified through the image's importance map.

At 208, a seam energy is computed for each seam. The overall energy of a given seam is based on the importance values of the individual pixels in the seam path through the importance map. A pixel's importance is computed by the image operator based on a contrast between the pixel relative to a neighborhood of pixels surrounding that pixel. Pixels with higher contrast with respect to neighboring pixels receive a higher importance.

At 210, seams are identified which are composed of background pixels based on seam energy. A seam of high energy is composed of pixels of higher importance. Such seams are deemed to have traversed content of higher importance within the document image. Seams of low energy are generally composed of background pixels of low importance such as white space or a uniformly colored background of the document.

At 212, adjacent background seams are grouped together to form background seam groups (BSGs). Each of the background seam groups have a seam group width. For example, if two adjacent background seams, each a single pixel in width, are joined together to for a seam group then this particular background seam group would have a width of 2 (two pixels wide). Likewise, if five adjacent background seams, each a single pixel in width, are joined together than this particular seam group would have a width of 5 (five pixels wide). All adjacent seams which have been previously identified as background seams are grouped together to form groups of individual background seams.

At 214, the background seam groups are classified into categories. For vertical resizing, the background seam groups are divided into three categories based upon their width and their location within the document image: (1) Narrow BSGs, whose widths denoted $W_n[i]$ are background seam groups having a width which is less than a pre-set threshold $t1v$. (2) Wide BSGs, whose widths denoted $W_W[i]$ are background seam groups having a width which is greater than a pre-set threshold $t2v$. (3) Text Line Spacing BSGs, whose widths denoted $W_T[i]$ are seam groups composed of seams located between horizontal rows of text. Text Line Spacing BSGs have a width which is $\geq t1v$ and $\leq t2v$.

Figure 2:
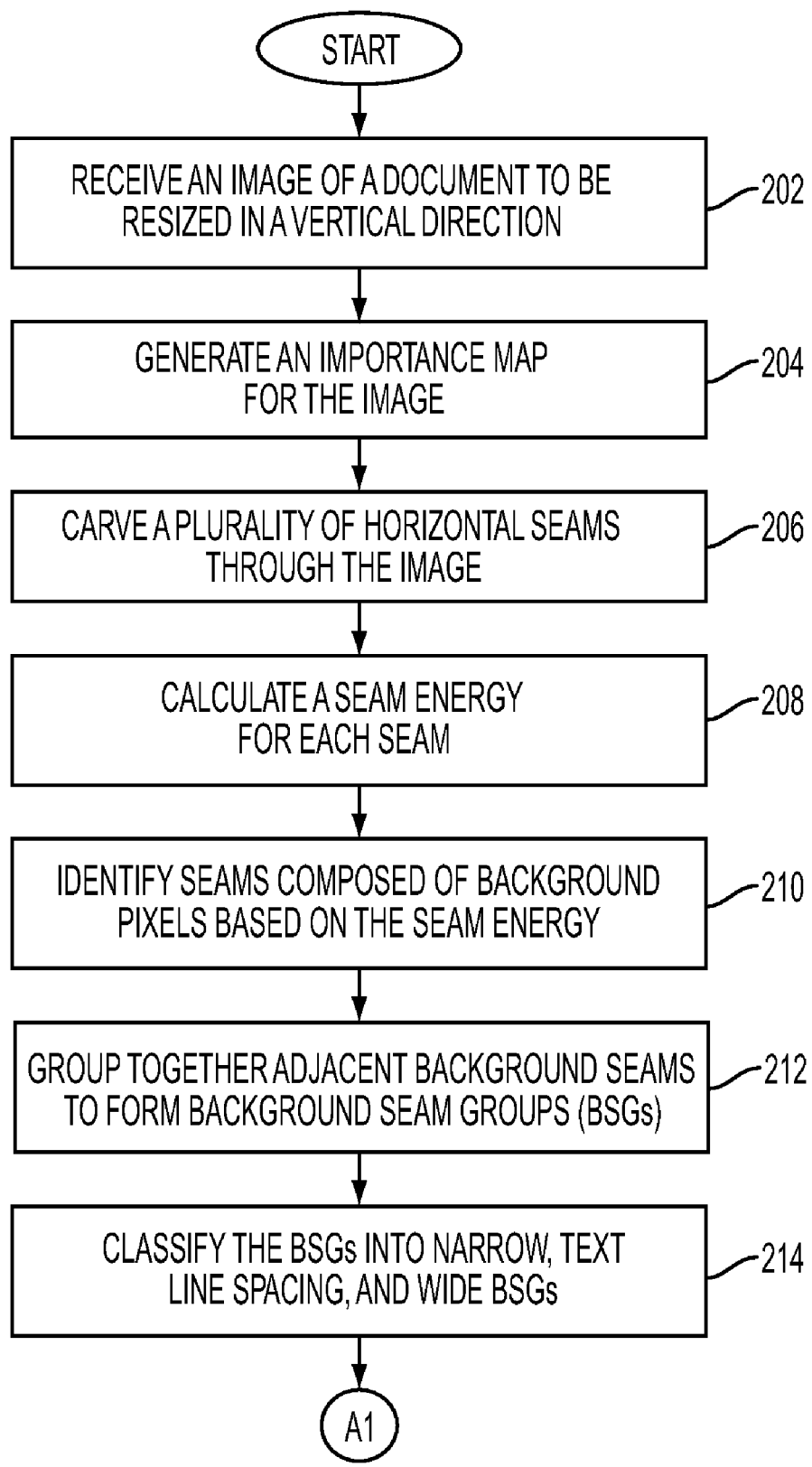
FIG. 2 is a flow diagram of one example embodiment of the present resizing method which reduces the size of an image along a vertical axis.
Figure 3:
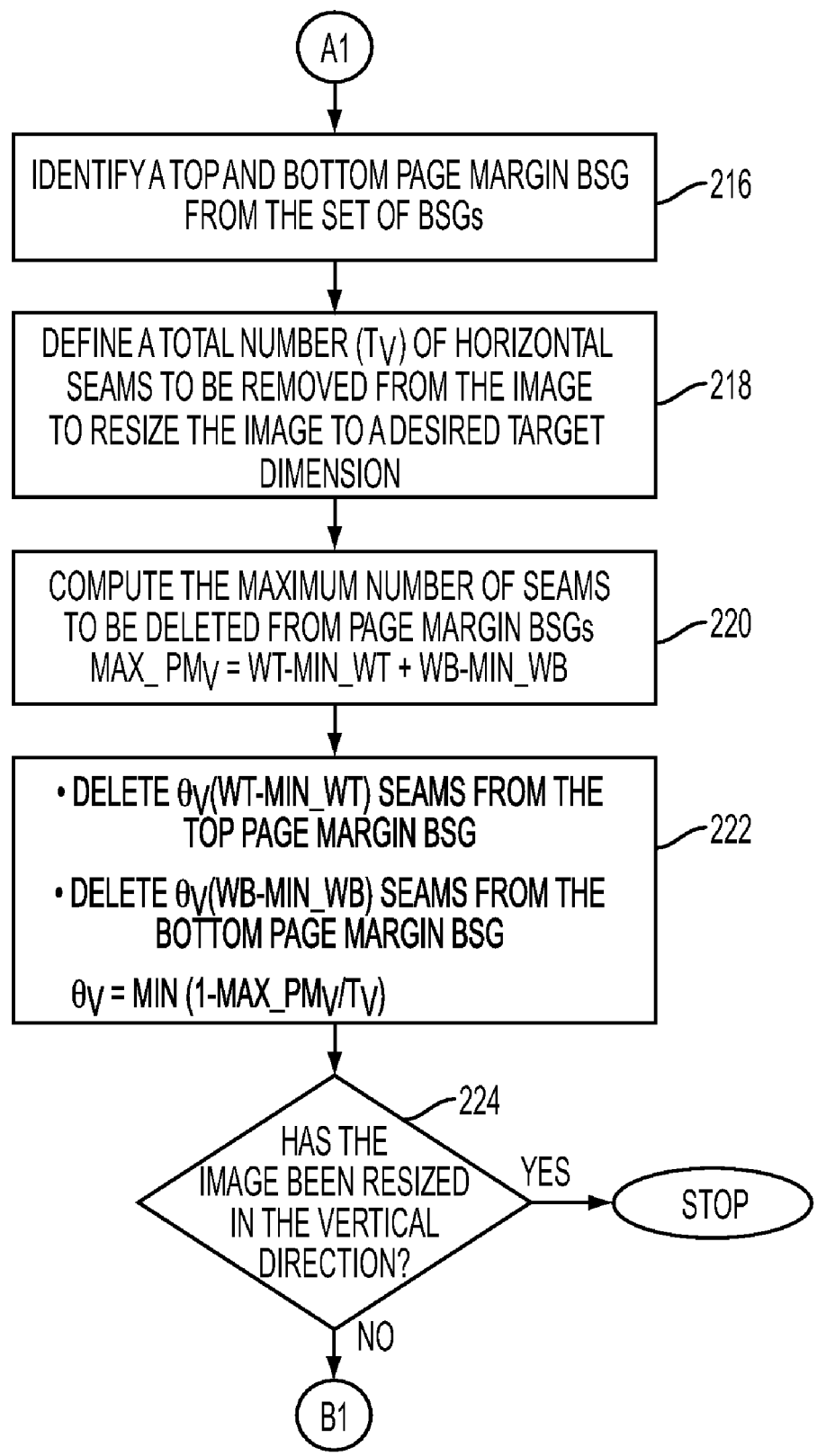
FIG. 3 is a continuation of the flow diagram of FIG. 2 with flow continuing with respect to node A1.

Reference is now being made to FIG. 3 which is a continuation of the flow diagram of FIG. 2 with flow continuing with respect to node A1.

At 216, seams along a top and bottom edge of a border of the document page are identified as Top Page Margin and Bottom Page Margin BSGs. Once the seams have been carved through the image (and the importance map) and the seams grouped and classified and the Top and Bottom Page Margin BSGs identified, the following steps are performed.

At 218, a total number ($T_V$) of horizontal seams to be removed from the image to resize the image to the desired target dimensions in the vertical direction is determined. In one embodiment, this is determined by calculating a difference between the size of the original image and the desired size of the resized image (in pixels) along the vertical axis. For example, if the horizontal seams are a single pixel in width and the image needs to be reduced by a total of 50 pixels in the vertical direction then a total of 50 horizontal seams need to be removed from the image.

At 220, the maximum number of seams that can be removed from the Page Margins BSGs is determined. In one embodiment, this is given by:

$$\text{Max\_PM}_v = (WT - \text{Min\_}WT) + (WB - \text{Min\_}WB), \quad (1)$$

where WT and WB are the widths of the Top Page Margin BSG and the Bottom Page Margin BSG, respectively, and Min_WT and Min_WB are minimum page margins as determined by the document's page margin requirements. If too many seams are removed from the page margins, the marking device used to render the resized document image may not be able to print content within the resized image document which now resides beyond the printable border areas which the device is capable of printing.

At 222, seams are deleted from the Top and Bottom Page Margin BSGs. In one embodiment, seam deletion in the page margins proceeds as follows:

Delete $\theta_v$ (WT−Min_WT) seams from the Top Page Margin BSG.

Delete $\theta_v$ (WB−Min_WB) seams from the Bottom Page Margin BSG.

where: $v_v$=Min(1, Max_PM$_V$/T$_V$).

At 224, a determination is made whether the image has been resized in the vertical direction to achieve the desired target dimensions. If (Max_PM$_V$≧T$_V$) then an adequate number of seams have been removed from the Top and Bottom Page Margin BSGs sufficient to resize the image to the desired target dimensions and no further processing is necessary. Otherwise, seams will have to be removed from the Wide BSGs.

Figure 4:
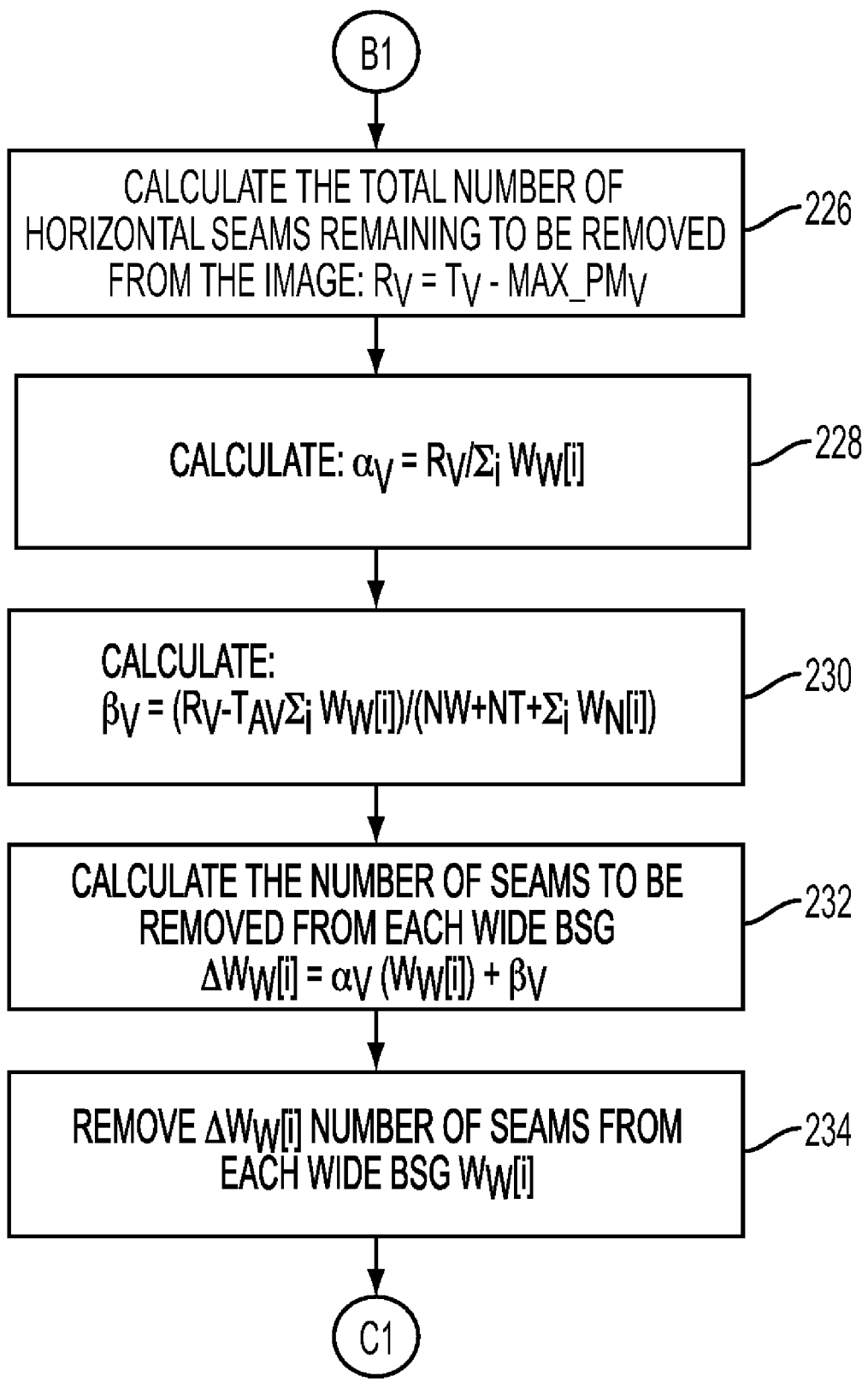
FIG. 4 is a continuation of the flow diagram of FIG. 3 with flow continuing with respect to node B1.

Reference is now being made to FIG. 4 which is a continuation of the flow diagram of FIG. 3 with flow continuing with respect to node B1.

At 226, the total number of seams remaining to be removed from the image is determined. In one embodiment, this is given by:

$$R_V = T_V - \text{Max\_PM}_V. \quad (2)$$

If ($R_V$=0), then no seams remain to be removed. In other words, the image was adequately resized solely by the removal of seams from the Page Margin BSGs.

At 228, calculating:

$$\alpha_v = R_V / \Sigma_i W_w[i]. \quad (3)$$

If ($\alpha_v \leq T_{AV}$), where $T_{AV}$ is a pre-set threshold ≦1, then the image can be adequately resized to the desired target dimensions by the removal of seams from the Wide BSGs. Otherwise, seams will have to be removed from the other BSGs.

At 230, calculate:

$$\beta_v = (R_V - T_{AV}\Sigma_i W_w[i])/(NW + NT + \Sigma_i W_n[i]), \quad (4)$$

where NW is the total number of seams in all the Wide BSGs, NT is the total number of seams in all the Text Line Spacing BSGs, and each Narrow BSG ($W_n[i]$) has a width which is greater than (t1v−T$_b$), where T$_b$ is a pre-set maximum for β.

At 232, the number of seams to be removed from each of the Wide BSGs is determined. In one embodiment, this is given by:

$$\Delta W_w[i] = \alpha_v(W_w[i]) + \beta_v. \quad (5)$$

At 234, a total of $\Delta W_w[i]$ seams are removed from each Wide BSG.

Figure 5:
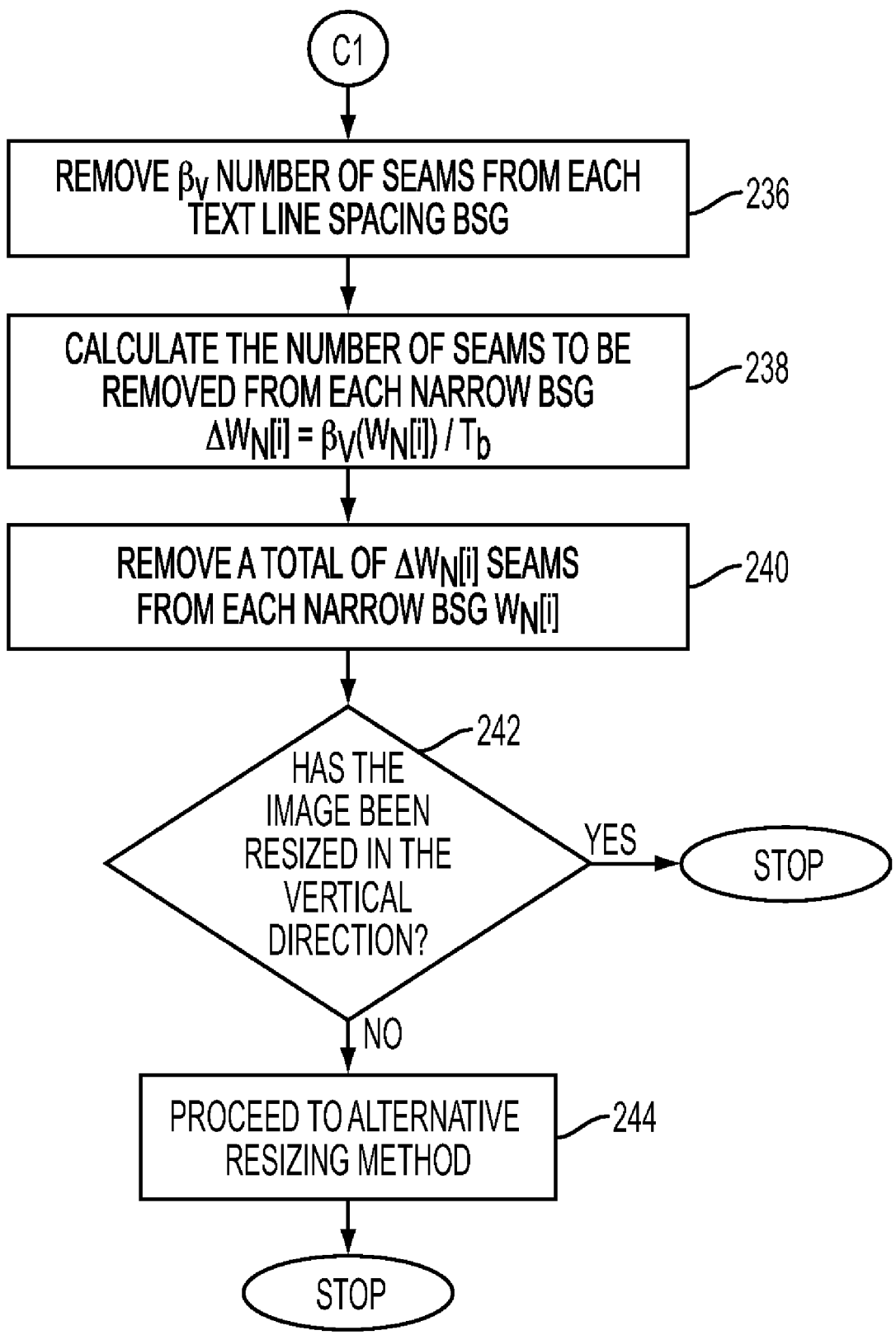
FIG. 5 is a continuation of the flow diagram of FIG. 4 with flow continuing with respect to node C1.

Reference is now being made to FIG. 5 which is a continuation of the flow diagram of FIG. 4 with flow continuing with respect to node C1.

At 236, a total of $\beta_v$ seams are removed from each Text Line Spacing BSG.

At 238, the number of seams to be removed from each Narrow BSG is determined. In one embodiment, this is given by:

$$\Delta W_n[i] = (\beta_v W_n[i])/T_b. \quad (6)$$

At 240, a total of $\Delta W_n[i]$ seams are removed from each $W_n[i]$.

At 242, a determination is made whether the image has been resized in the vertical direction to achieve the desired target dimensions. If ($\beta_v \leq T_b$), then a sufficient number of seams have been deleted to achieve the target dimensions in the vertical direction and no further processing is necessary. Otherwise, at 244, other resizing methods for identifying and removing seams from the image would be required to resize the image in the vertical direction to achieve the desired target dimensions. Alternatively, a message is provided to the user that the target output dimensions of the image cannot be achieved by the present resizing method.

Horizontal Resizing Method

Figure 6:
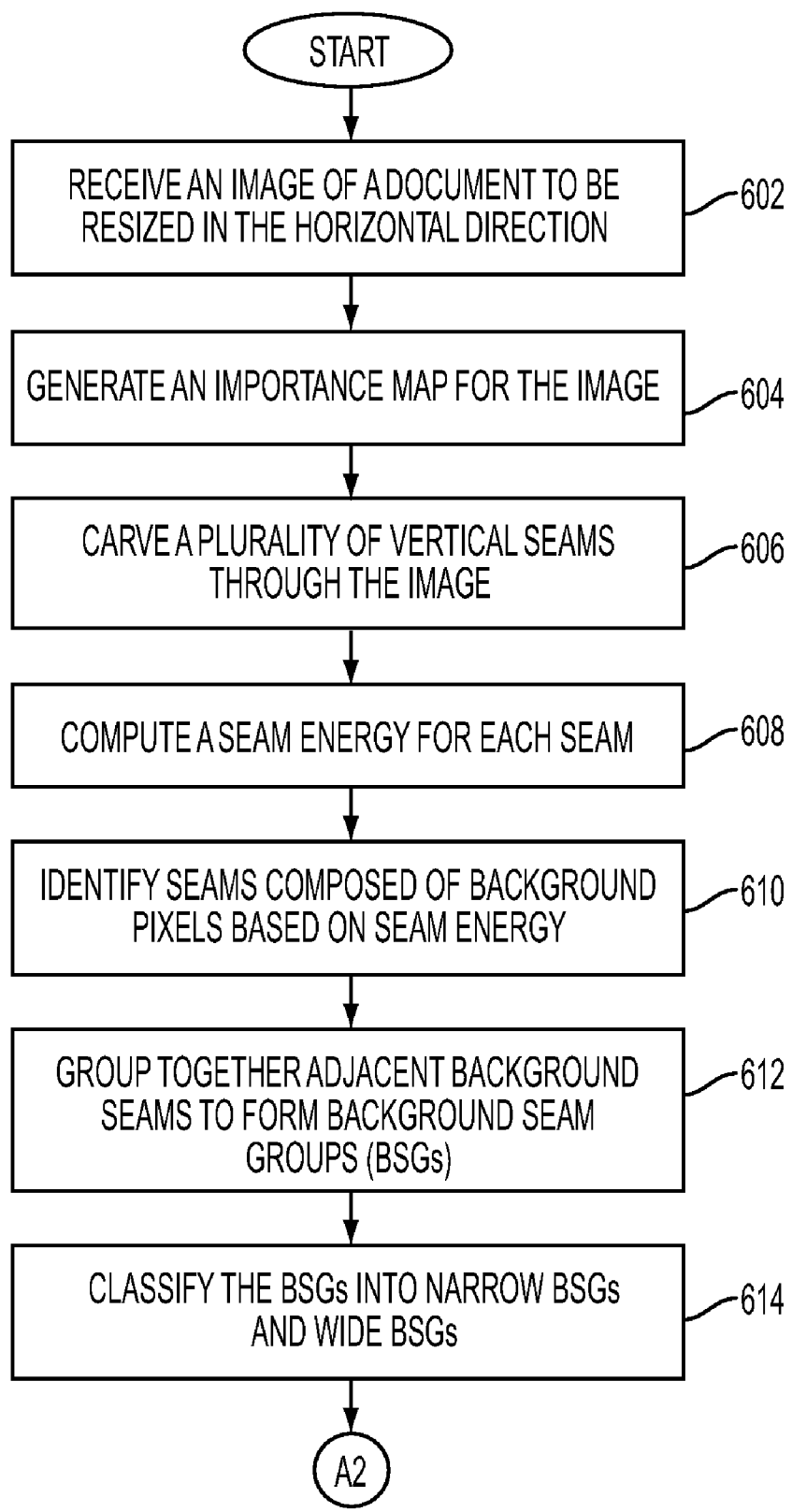
FIG. 6 is a flow diagram of one example embodiment of the present resizing method which reduces the size of an image along a horizontal axis.
Figure 7:
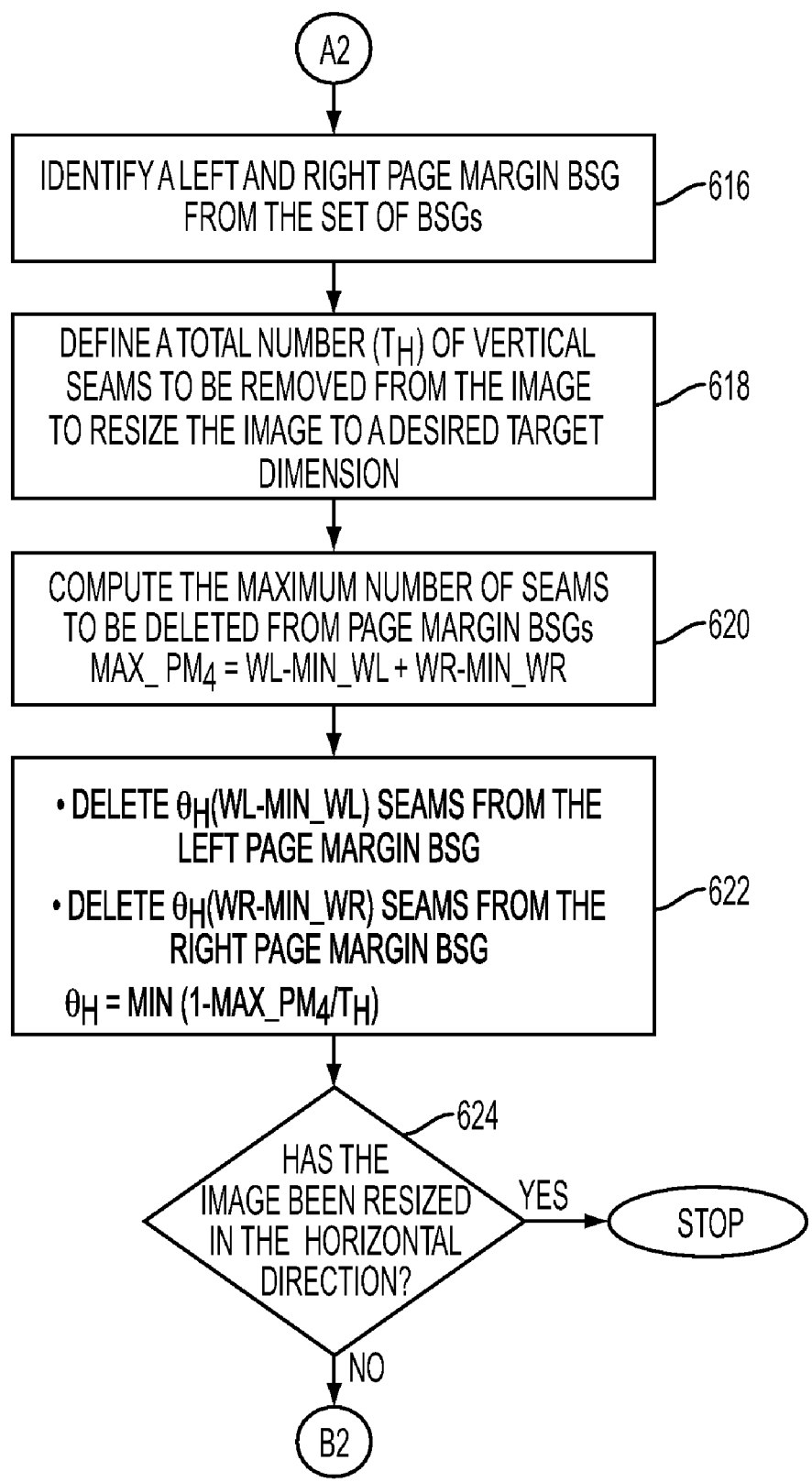
FIG. 7 is a continuation of the flow diagram of FIG. 6 with flow continuing with respect to node A2.
Figure 8:
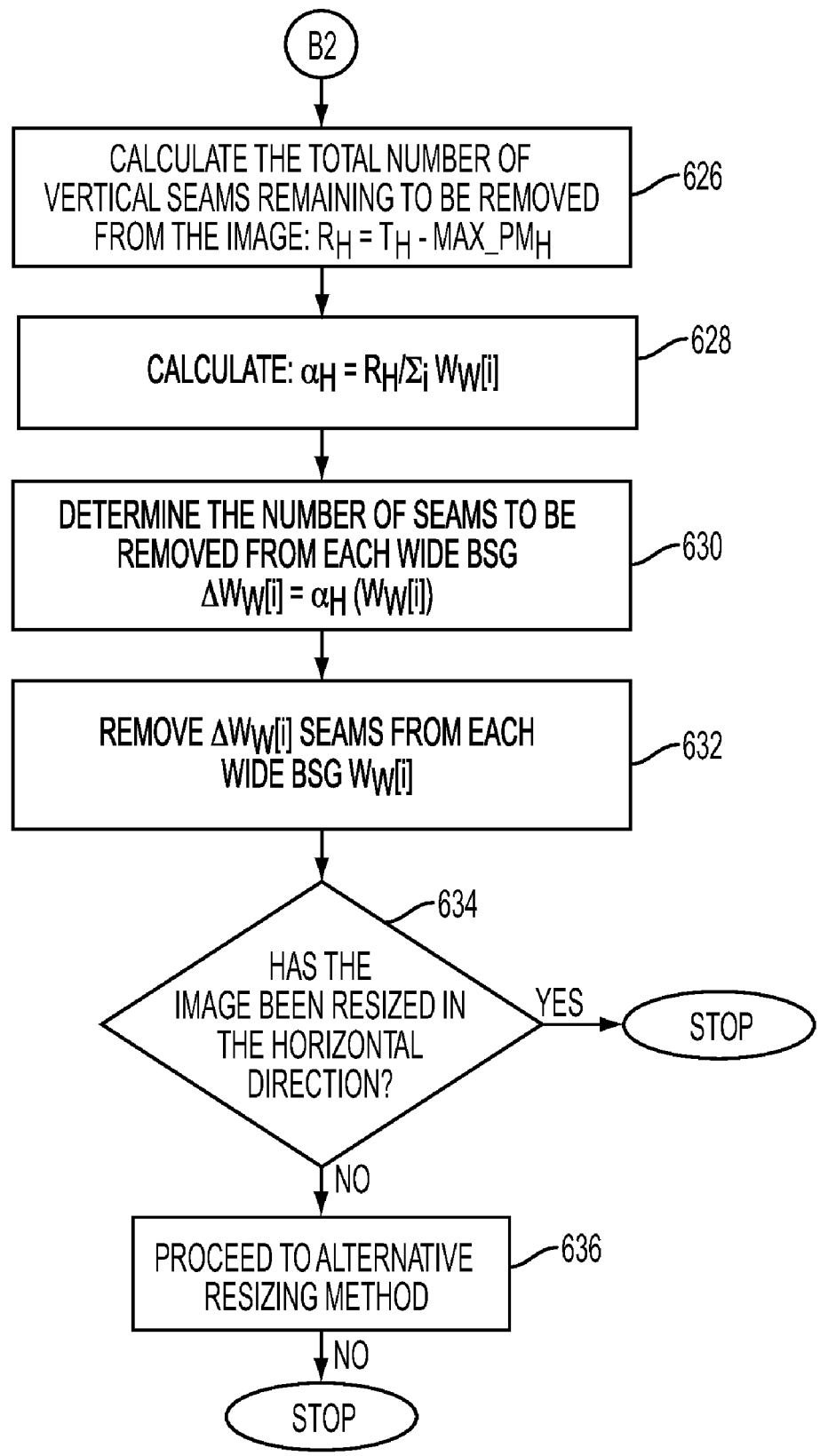
FIG. 8 is a continuation of the flow diagram of FIG. 7 with flow continuing with respect to node B2.

Reference is now being made to FIGS. 6 through 8 which collectively illustrate one example embodiment of a flow diagram of the present resizing method which reduces the size of an image along a horizontal axis. Vertical seams are carved through the image, for example from a top edge to a bottom edge, and removed in a manner in accordance with the teachings hereof such that the size of the image is reduced along a horizontal axis of the image to achieve a desired target dimension.

For the following initial steps 602-612, processing proceeds in a manner substantially similar to steps 302-312 as previously described with respect to the method of vertical resizing but in the horizontal direction. Duplicative explanatory text common thereto has been omitted for brevity.

At 602, an image of a document to be resized in the horizontal direction is received. At 604, an importance map is generated for the image. The importance map for the image is composed of the collection of individual pixel importance values. At 606, a plurality of seams are carved through the document image using a seam carving technique, as previously described. At 608, a seam energy is computed for each seam. Seam energy is based on importance values of the pixels in the seam path through the importance map. At 610, seams are identified which are composed of background pixels based on seam energy. At 612, adjacent background seams are joined together to form background seam groups (BSGs). Each of the background seam groups have a group width.

At 614, the background seam groups are classified into categories. For horizontal resizing, the BSGs are divided into two categories based upon width and location: 1) Narrow BSGs, whose widths denoted $W_n[i]$, are background seam groups having a width which is narrower than a pre-set threshold t1h. Narrow BSGs are background seam groups which traverse the narrow regions between text characters in the document. 2) Wide BSGs, whose widths denoted $W_w[i]$, are background seam groups having a width which is wider than the threshold t1h. There are no Text Line Spacing BSGs in the horizontal resizing method hereof because the seams traverse vertically (top to bottom) through the image and not horizontally (left to right) between rows of text. Text Line Spacing BSGs are background seam groups which traverse the document horizontally between the line spacing of rows of text. In one embodiment, the threshold t1h between the Narrow and Wide BSGs is defined by a minimum horizontal spacing between text in the document.

Reference is now being made to FIG. 7 which is a continuation of the flow diagram of FIG. 6 with flow continuing with respect to node A2.

At 616, seams along a left and right edge of a border of the document page are identified from the set of background seam groups. These seams are referred to herein as the Left Page Margin BSG and the Right Page Margin BSG.

Once the seams have been carved through the image and the seams grouped and classified and the Page Margin BSGs identified, the following are performed.

At 618, a total number ($T_H$) of vertical seams to be removed from the entire page sufficient to resize the image to the target dimensions in the horizontal direction is defined. This can be determined by a difference between the size of the original image and the target size of the output image (in pixels) in the horizontal direction.

At 620, the maximum number of seams that can be deleted from the Left and Right Page Margin BSGs is determined. In one embodiment, this is given by:

$$\text{Max\_PM}_H = (WL - \text{Min\_WL}) + (WR - \text{Min\_WR}), \quad (7)$$

where WL and WR are the widths of the Left and Right Page Margin BSGs, and Min_WL and Min_WR are the minimum page margins as determined by the document's page margin requirements.

At 622, seams are deleted from the Page Margin BSGs. In one embodiment, this is done according to the following two steps:

Delete $\theta_H$ (WL−Min_WL) seams from the Left Page Margin BSG

Delete $\theta_H$ (WR−Min_WR) seams from the Right Page Margin BSG.

where: $\theta_H = \text{Min}(1, \text{Max\_PM}_H/T_H)$.

At 624, a determination is made whether the image as been resized to the desired target dimension in the horizontal direction. If (Max_PM$_H \geq T_H$) then an adequate number of seams have been removed from the Left and Right Page Margin BSGs sufficient to resize the image to the desired target dimensions and no further processing is necessary. Otherwise, seams will have to be removed from the Wide BSGs.

Reference is now being made to FIG. 8 which is a continuation of the flow diagram of FIG. 7 with flow continuing with respect to node B2.

At 626, the total number of seams remaining to be removed from the image is determined. In one embodiment, this is given by:

$$R_H = T_H - \text{Max\_PM}_H. \quad (8)$$

If ($R_V = 0$), then no seams remain to be removed.

At 628, calculate:

$$\alpha_H = R_H / \Sigma_i W_w[i]. \quad (9)$$

At 630, determine the total number of seams to be removed from each Wide BSG. In one embodiment, this is given by:

$$\Delta W_w[i] = \alpha_H(W_w[i]). \quad (10)$$

At 632, a total of $\Delta W_w[i]$ seams are removed from each Wide BSG.

At 634, a determination is made whether the image as been resized in the horizontal direction to achieve the desired target dimensions. If ($\alpha_G \leq T_{ah}$) where $T_{ah}$ is a pre-set threshold $\leq 1$, resizing can be accomplished by removing seams from the Page Margin and Wide BSGs and no further processing is required. At this point, no more vertical seams can be removed without impacting the visual balance of the background of the image. Otherwise, at 636, other resizing methods for identifying and removing seams from the image would be required to resize the image in the horizontal direction to achieve the desired target dimensions. Alternatively, a message is provided to the user that the target output dimensions of the image cannot be achieved by the present resizing method.

It should be understood that the present method is likely to be used in addition to other resizing techniques known in the arts which have their own advantages depending on the types of document images being resized and the content contained therein. If the removal of background and white space using the present technique does not achieve the desired resizing dimensions because, for instance, there is insufficient background in the image to be removed to reach the target dimensions, then a secondary resizing operation such as, for instance, content-aware or cropping/scaling, may be employed.

Further, an initial determination can be made whether a sufficient number of seams can effectively be removed (either horizontally or vertically, or both) before proceeding to delete any seams from any BSGs in the image document according to the above-described method. If it is determined at the onset that an insufficient number of seams exist the BSGs which can be effectively removed to resize the document to the desired target dimensions without any visual distortions being introduced thereby, then a decision can be made to either proceed with the present resizing method deleting only a subset of the number of seams in any of the vertical or horizontal directions or to proceed to resize the document image using an alternative resizing method. Additionally, the desired target dimensions can be re-adjusted so that the image can be effectively reduced using the present method.

An implementation of the above for horizontal and vertical resizing could be readily achieved by a software or hardware construct. In one example, a data structure comprising a linked lists of records which point to the carved seams and their respective group associations is maintained. Seams which are to be removed from any particular BSG, as described above, are merely deleted from their respective records and the records re-linked in a manner which is well known to those of ordinary skill in the software programming arts. After the required number of seams have been deleted from their respective BSGs, the remaining seams comprising the resized image are reassembled and the image sent to an image output device. The present resizing method can be implemented in an ASIC, for example, placed in the image path of an image processing system. The specifics of any given implementation hereof will depend on the type of system and the image processing environment wherein the present method finds its intended uses.

Figure 9:
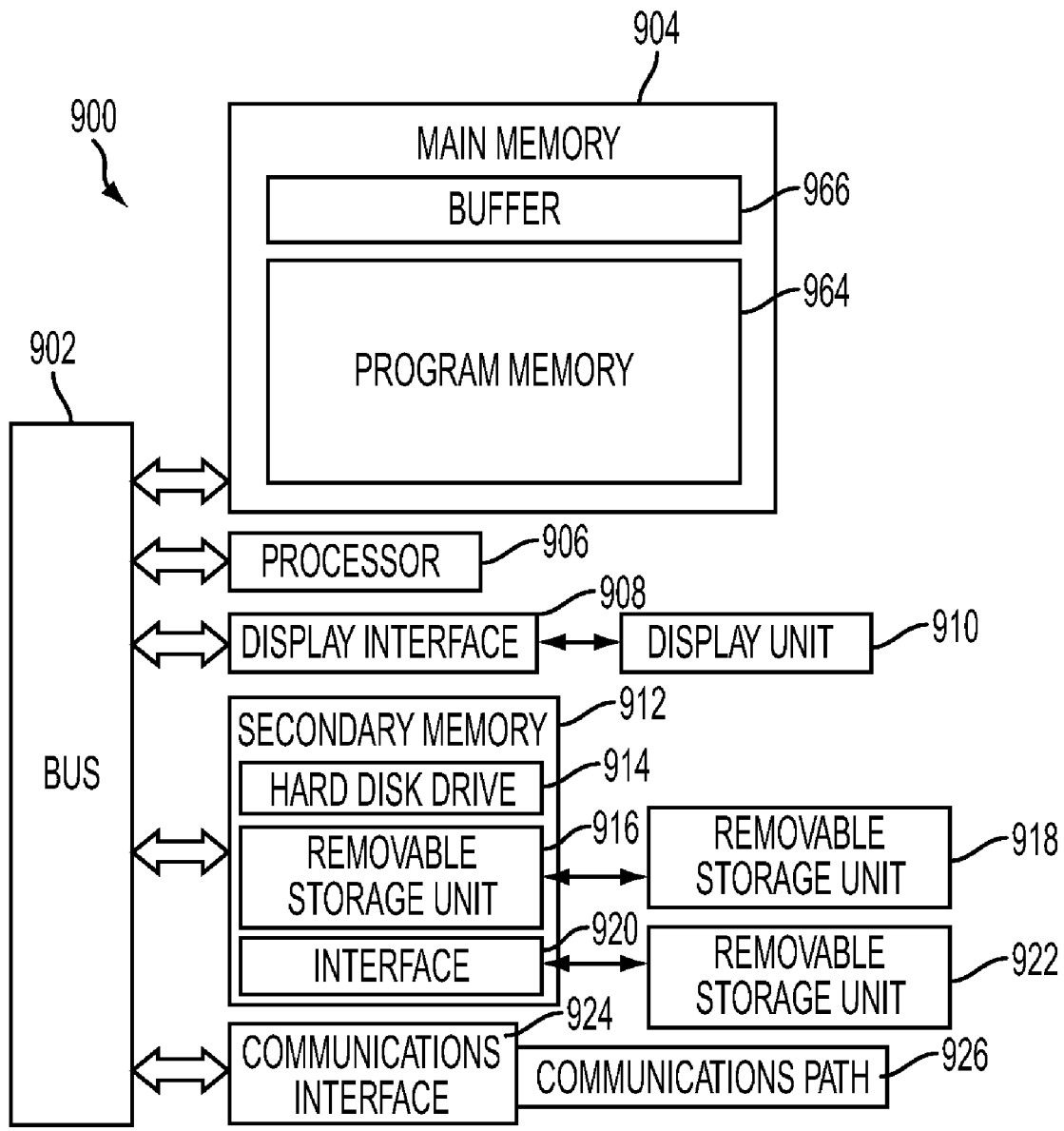
FIG. 9 illustrates a block diagram of one embodiment of a special purpose computer system useful for implementing one or more aspects of the present image resizing method.

Reference is now made to FIG. 9 which illustrates a block diagram of one example embodiment of a special purpose computer useful for implementing one or more aspects of the present resizing method. Such a system could be implemented as a separate computer system, or as electronic circuit, or in an ASIC, for example. The nature of the exact implementation will depend on the image processing environment wherein the present image resizing method finds its intended uses.

Special purpose computer system 900 includes processor 906 for executing machine executable program instructions for carrying out the present image resizing method. The processor is in communication with bus 902. The system includes main memory 904 for storing machine readable instructions. Main memory may comprise random access memory (RAM) to support reprogramming and flexible data storage. Buffer 966 stores data addressable by the processor. Program memory 964 stores program instructions. A display interface 908 forwards data from bus 902 to display 910. Secondary memory 912 includes a hard disk 914 and storage device 916 capable of reading/writing to removable storage unit 918, such as a floppy disk, magnetic tape, optical disk, etc. Secondary memory 912 further includes other mechanisms for allowing programs or other machine executable instructions to be loaded into the processor. Such mechanisms may include, for example, a storage unit 922 adapted to exchange data through interface 920 which enables the transfer of software and data to the processor. The system includes a communications interface 924 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 926 which carries such signals and may be implemented using wire, cable, fiber optic, phone line, cellular link, RF, memory, or other means known in the arts.

Figure 10:
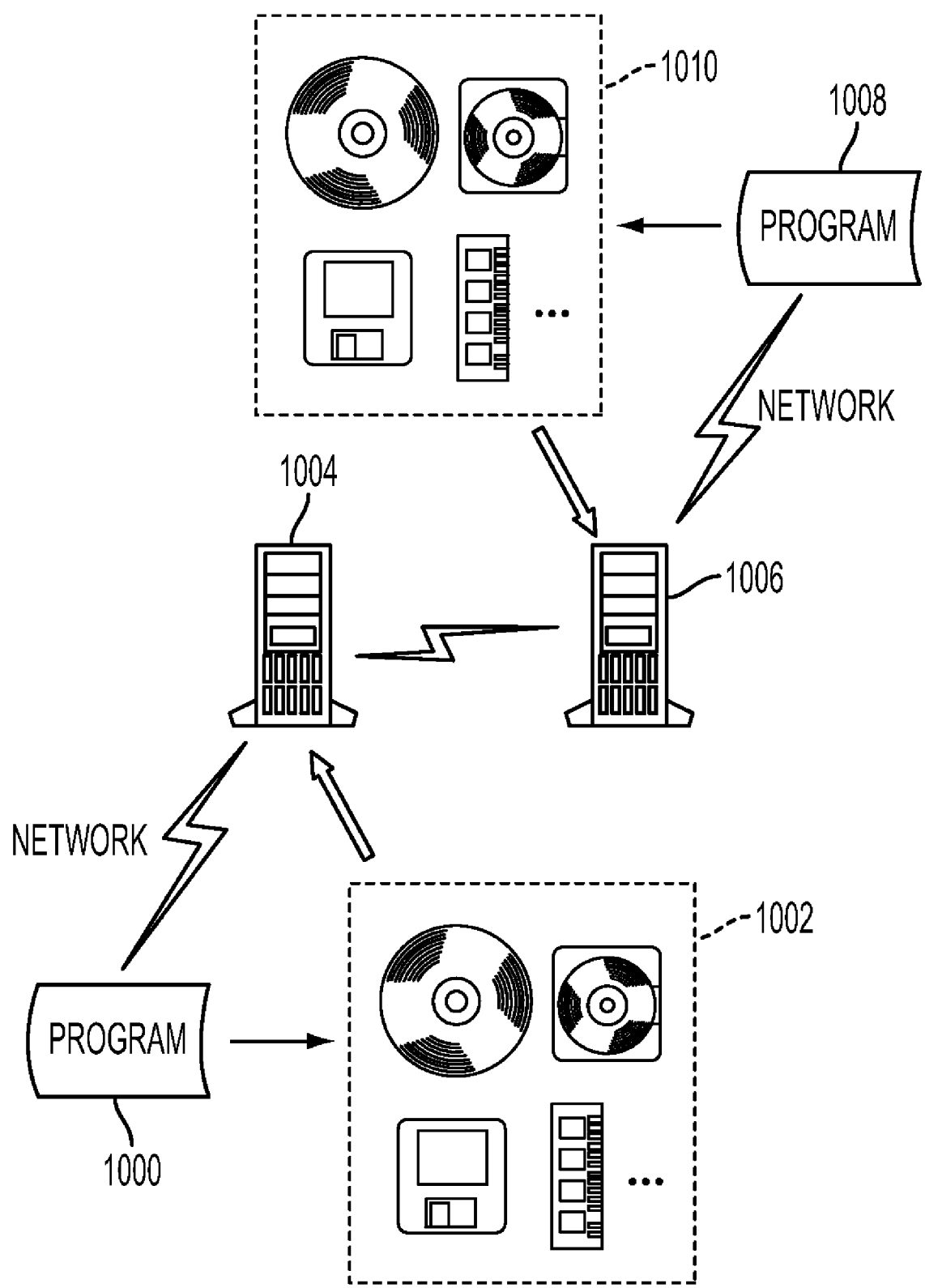
FIG. 10 is an explanatory diagram illustrating one example computer readable medium capable of storing machine readable instructions which, when mounted on a computer or a special purpose computer system, causes the system to perform one or more aspects of the present method.

Reference is now made to FIG. 10 which is an explanatory diagram illustrating one example of a computer readable storage medium capable of storing machine readable instructions which, when mounted on a computer or a special purpose computer system, causes the system to perform one or more aspects of the present image resizing method (image reduction and/or image enlargement) as described above. One or more computer program instructions 1000 for carrying out one or more aspects of the present method are loaded on a computer readable media 1002. Various embodiments of a computer readable media include optical disks (CD-ROM etc.), magnetic disks, magnetic cards, memories (including IC cards and memory card), and the like. The storage media stores the machine readable program instructions for transport and storage by changing magnetic, optical, and/or energy states of the media in response to program description instructions having been transferred thereon. The storage medium can then be mounted on computer system 1004 and the machine readable program instructions contained in the computer readable medium executed by a processor. The machine readable instructions loaded onto computer system 1004 can be transmitted or otherwise communicated to computer system 1006 and, in turn, mounted thereon for subsequent execution. The machine readable program instructions can be transferred over a network in original form or modified or incorporated with another program 1008 and stored on storage media 1010. The computer systems shown include one or more processors and/or a special purpose computer systems capable of executing machine readable program instructions for carrying out one or more aspects of the present method as described herein. This illustration shows that the machine readable instructions may be executed by one computer system, modified, and transferred to another computer system and off-loaded onto yet another computer program product.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein. Computer readable medium may additionally comprise information in a transitory state medium such as a network link or a network interface which may include a wired network or a wireless network which allows a computer to read such computer readable information.

It should be understood that the flow diagrams hereof are intended to be illustrative. Other operations may be added, modified, enhanced, or consolidated. Variations thereof are intended to fall within the scope of the appended claims.

It should also be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for resizing an image of a document in an image processing system, the method comprising:
   receiving an image of a document to be resized to a desired target dimension, said image having a plurality of pixels;
   carving a plurality of seams from a first edge to a second edge of said image in one of a horizontal and vertical direction based on an importance map generated for said image;
   calculating an energy for each of said seams;
   identifying seams composed of background pixels based on said seam energy;
   grouping adjacent seams together to form background seam groups;
   classifying said background seam groups based upon their respective overall seam group width;
   determining a target number of seams to be removed from said background seam groups based on a width of said background seam group;
   removing said target number of seams from said background seam groups until said image has been resized to a desired target dimension, comprising removing seams of wider background seam groups first before removing seams from progressively narrower background seam groups, each of said background seams groups retaining their ordering by their respective overall seam group width such that, if a background seam group is wider than a next smaller background seam group before resizing, it will not be any narrower than the next smaller seam group after resizing; and providing said resized image of said document to an image output device.

2. The method of claim 1, wherein generating said importance map for said image comprises:
- selecting at least one image operator responsive to changes in pixels based on image content;
- using said selected image operator to determine an importance value for each pixel in said image, each pixel importance value being determined with respect to pixels in a neighborhood of pixels surrounding said pixel; and
- forming said importance map from said pixel importance values.

3. The method of claim 1, wherein said target number of seams to be removed from each of said background seam groups is such that a monotonically non-decreasing number of seams are removed from background seam groups of wider widths than are removed from background seam groups of narrower widths.

4. The method of claim 1, wherein said image is to be resized in a vertical direction, further comprising:
- identifying background seams within a top and bottom page margin boundary of said image document;
- grouping adjacent seams together to form background seam groups (BSGs);
- classifying said seam groups into Top Page Margin and Bottom Page Margin BSGs, based upon overall seam group width;
- determining a total number $T_V$ of horizontal seams to be removed from said image document to resize said image to said desired target dimensions in a vertical direction;
- determining a maximum number $Max\_PM_V$ of seams to be removed from said page margin groups to resize said document in a vertical direction, comprising:

$$Max\_PM_V = (WT - Min\_WT) + (WB - Min\_WB),$$

where WT and WB are widths of said Top Page Margin and Bottom Page Margin BSGs, respectively, and Min_WT and Min_WB are minimum page margins as determined by said document's page margin requirements; and
- deleting seams from said Top and Bottom Page Margin BSGs, comprising:
  - deleting $\theta_V(WT - Min\_WT)$ seams from said Top Page Margin BSGs; and
  - deleting $\theta_V(WB - Min\_WB)$ seams from said Bottom Page Margin BSGs,
  - where $\theta_V = Min(1, Max\_PM_V/T_V)$, such that if $(Max\_PM_V \geq T_V)$ then an adequate number of seams can be removed from said Top and Bottom Page Margin BSGs to resize said image to said desired target dimensions, otherwise seams will have to be removed from said Wide BSGs.

5. The method of claim 1, wherein said image is to be resized in a horizontal direction, further comprising:
- identifying background seams within a left and right page margin boundary of said image document;
- grouping adjacent seams together to form background seam groups (BSGs);
- classifying said seam groups into Left Page Margin and Right Page Margin BSGs, based upon overall seam group width;
- determining a total number $T_H$ of vertical seams to be removed from said image to resize said image to said target dimensions in a horizontal direction;
- determining a maximum number $Max\_PM_H$ of seams to be removed from said page margin groups to resize said document in a horizontal direction, comprising:

$$Max\_PM_H = (WL - Min\_WL) + (WR - Min\_WR),$$

where WL and WR are widths of said Left and Right Page Margin BSGs, and Min_WL and Min_WR are minimum page margins as determined by said document's page margin requirements; and
- removing said determined number of seams from each of said page margin groups by deleting seams from said Left and Right Page Margin BSGs, comprising:
  - deleting $\theta_H(WL - Min\_WL)$ seams from said Left Page Margin BSGs; and
  - deleting $\theta_H(WR - Min\_WR)$ seams from said Right Page Margin BSGs,
  - where $\theta_H = Min(1, Max\_PM_H/T_H)$, such that if $(Max\_PM_H \geq T_H)$ then an adequate number of seams can be removed from said Left and Right Page Margin BSGs to resize said image to said desired target dimensions and no further processing is necessary, otherwise, seams will have to be removed from said Wide BSGs.

6. The method of claim 1, wherein said image is to be resized in a vertical direction, further comprising:
- grouping together adjacent seams located between horizontal rows of text in said image document to form Text Line Spacing background seam groups (BSGs);
- classifying said Text Line Spacing BSGs based upon their respective overall seam group width; and
- removing said Text Line Spacing BSGs until said image has been resized to said desired target dimension.

7. A system for resizing an image of a document in an image processing system, the system comprising:
- a memory;
- a storage medium; and
- a processor in communication with said storage medium and said memory, said processor executing machine readable instructions for performing:
  - receiving an image of a document to be resized to a desired target dimension, said image having a plurality of pixels;
  - carving a plurality of seams from a first edge to a second edge of said image in one of a horizontal and vertical direction based on an importance map generated for said image;
  - calculating an energy for each of said seams;
  - identifying seams composed of background pixels based on said seam energy;
  - grouping adjacent seams together to form background seam groups;
  - classifying said background seam groups based upon their respective overall seam group width;
  - determining a target number of seams to be removed from said background seam groups based on a width of said background seam group;
  - removing said target number of seams from said background seam groups until said image has been resized to a desired target dimension, comprising removing seams of wider background seam groups first before removing seams from progressively narrower background seam groups, each of said background seams groups retaining their ordering by their respective overall seam group width such that, if a background seam group is wider than a next smaller background seam group before resizing, it will not be any narrower than the next smaller seam group after resizing; and
  - providing said resized image of said document to an image output device.

8. The system of claim 7, wherein generating said importance map for said image comprises:
   selecting at least one image operator responsive to changes in pixels based on image content;
   using said selected image operator to determine an importance value for each pixel in said image, each pixel importance value being determined with respect to pixels in a neighborhood of pixels surrounding said pixel; and
   forming said importance map from said pixel importance values.

9. The system of claim 7, wherein said target number of seams to be removed from each of said background seam groups is such that a monotonically non-decreasing number of seams are removed from background seam groups of wider widths than are removed from background seam groups of narrower widths.

10. The system of claim 7, wherein said image is to be resized in a vertical direction, further comprising:
   identifying background seams within a top and bottom page margin boundary of said image document;
   grouping adjacent seams together to form background seam groups (BSGs);
   classifying said seam groups into Top Page Margin and Bottom Page Margin BSGs, based upon overall seam group width;
   determining a total number $T_V$ of horizontal seams to be removed from said image document to resize said image to said desired target dimensions in a vertical direction;
   determining a maximum number $Max\_PM_V$ of seams to be removed from said page margin groups to resize said document in a vertical direction, comprising:

$$Max\_PM_V = (WT - Min\_WT) + (WB - Min\_WB),$$

where WT and WB are widths of said Top Page Margin and Bottom Page Margin BSGs, respectively, and Min_WT and Min_WB are minimum page margins as determined by said document's page margin requirements; and
   deleting seams from said Top and Bottom Page Margin BSGs, comprising:
      deleting $\theta_V(WT - Min\_WT)$ seams from said Top Page Margin BSGs; and
      deleting $\theta_V(WB - Min\_WB)$ seams from said Bottom Page Margin BSGs,
      where $\theta_V = Min(1, Max\_PM_V/T_V)$, such that if $(Max\_PM_V \geq T_V)$ then an adequate number of seams can be removed from said Top and Bottom Page Margin BSGs to resize said image to said desired target dimensions, otherwise seams will have to be removed from said Wide BSGs.

11. The system of claim 7, wherein said image is to be resized in a horizontal direction, further comprising:
   identifying background seams within a left and right page margin boundary of said image document;
   grouping adjacent seams together to form background seam groups (BSGs);
   classifying said seam groups into Left Page Margin and Right Page Margin BSGs, based upon overall seam group width;
   determining a total number $T_H$ of vertical seams to be removed from said image to resize said image to said target dimensions in a horizontal direction;
   determining a maximum number $Max\_PM_H$ of seams to be removed from said page margin groups to resize said document in a horizontal direction, comprising:

$$Max\_PM_H = (WL - Min\_WL) + (WR - Min\_WR),$$

where WL and WR are widths of said Left and Right Page Margin BSGs, and Min_WL and Min_WR are minimum page margins as determined by said document's page margin requirements; and
   removing said determined number of seams from each of said page margin groups by deleting seams from said Left and Right Page Margin BSGs, comprising:
      deleting $\theta_H(WL - Min\_WL)$ seams from said Left Page Margin BSGs; and
      deleting $\theta_H(WR - Min\_WR)$ seams from said Right Page Margin BSGs,
      where $\theta_H = Min(1, Max\_PM_H/T_H)$, such that if $(Max\_PM_H \geq T_H)$ then an adequate number of seams can be removed from said Left and Right Page Margin BSGs to resize said image to said desired target dimensions and no further processing is necessary, otherwise, seams will have to be removed from said Wide BSGs.

12. The system of claim 7, wherein said image is to be resized in a vertical direction, further comprising:
   grouping together adjacent seams located between horizontal rows of text in said image document to form Text Line Spacing background seam groups (BSGs);
   classifying said Text Line Spacing BSGs based upon their respective overall seam group width; and
   removing said Text Line Spacing BSGs until said image has been resized to said desired target dimension.

13. A computer program product for resizing an image of a document in an image processing system, the computer program product comprising:
   a non-transitory computer readable medium for storing instructions that, when executed on a computer, cause the computer to perform a method comprising:
      receiving an image of a document to be resized to a desired target dimension, said image having a plurality of pixels;
      carving a plurality of seams from a first edge to a second edge of said image in one of a horizontal and vertical direction based on an importance map generated for said image;
      calculating an energy for each of said seams;
      identifying seams composed of background pixels based on said seam energy;
      grouping adjacent seams together to form background seam groups;
      classifying said background seam groups based upon their respective overall seam group width;
      determining a target number of seams to be removed from said background seam groups based on a width of said background seam group;
      removing said target number of seams from said background seam groups until said image has been resized to a desired target dimension, comprising removing seams of wider background seam groups first before removing seams from progressively narrower background seam groups, each of said background seams groups retaining their ordering by their respective overall seam group width such that, if a background seam group is wider than a next smaller background seam group before resizing, it will not be any narrower than the next smaller seam group after resizing; and
      providing said resized image of said document to an image output device.

14. The computer program product of claim 13, wherein generating said importance map for said image comprises:

selecting at least one image operator responsive to changes in pixels based on image content;

using said selected image operator to determine an importance value for each pixel in said image, each pixel importance value being determined with respect to pixels in a neighborhood of pixels surrounding said pixel; and forming said importance map from said pixel importance values.

15. The computer program product of claim 13, wherein said target number of seams to be removed from each of said background seam groups is such that a monotonically non-decreasing number of seams are removed from background seam groups of wider widths than are removed from background seam groups of narrower widths.

16. The computer program product of claim 13, wherein said image is to be resized in a vertical direction, further comprising:

identifying background seams within a top and bottom page margin boundary of said image document;

grouping adjacent seams together to form background seam groups (BSGs);

classifying said seam groups into Top Page Margin and Bottom Page Margin BSGs, based upon overall seam group width;

determining a total number $T_V$ of horizontal seams to be removed from said image document to resize said image to said desired target dimensions in a vertical direction;

determining a maximum number $\text{Max\_PM}_V$ of seams to be removed from said page margin groups to resize said document in a vertical direction, comprising:

$$\text{Max\_PM}_V = (WT - \text{Min\_}WT) + (WB - \text{Min\_}WB),$$

where WT and WB are widths of said Top Page Margin and Bottom Page Margin BSGs, respectively, and Min_WT and Min_WB are minimum page margins as determined by said document's page margin requirements; and deleting seams from said Top and Bottom Page Margin BSGs, comprising:

deleting $\theta_V(WT-\text{Min\_}WT)$ seams from said Top Page Margin BSGs; and deleting $\theta_V(WB-\text{Min\_}WB)$ seams from said Bottom Page Margin BSGs, where $\theta_V=\text{Min}(1, \text{Max\_PM}_V/T_V)$, such that if $(\text{Max\_PM}_V \geq T_V)$ then an adequate number of seams can be removed from said Top and Bottom Page Margin BSGs to resize said image to said desired target dimensions, otherwise seams will have to be removed from said Wide BSGs.

17. The computer program product of claim 13, wherein said image is to be resized in a horizontal direction, further comprising:

identifying background seams within a left and right page margin boundary of said image document;

grouping adjacent seams together to form background seam groups (BSGs);

classifying said seam groups into Left Page Margin and Right Page Margin BSGs, based upon overall seam group width;

determining a total number $T_H$ of vertical seams to be removed from said image to resize said image to said target dimensions in a horizontal direction;

determining a maximum number $\text{Max\_PM}_H$ of seams to be removed from said page margin groups to resize said document in a horizontal direction, comprising:

$$\text{Max\_PM}_H = (WL - \text{Min\_}WL) + (WR - \text{Min\_}WR),$$

where WL and WR are widths of said Left and Right Page Margin BSGs, and Min_WL and Min_WR are minimum page margins as determined by said document's page margin requirements; and removing said determined number of seams from each of said page margin groups by deleting seams from said Left and Right Page Margin BSGs, comprising:

deleting $\theta_H(WL-\text{Min\_}WL)$ seams from said Left Page Margin BSGs; and deleting $\theta_H(WR-\text{Min\_}WR)$ seams from said Right Page Margin BSGs, where $\theta_H=\text{Min}(1, \text{Max\_PM}_H/T_H)$, such that if $(\text{Max\_PM}_H \geq T_H)$ then an adequate number of seams can be removed from said Left and Right Page Margin BSGs to resize said image to said desired target dimensions and no further processing is necessary, otherwise, seams will have to be removed from said Wide BSGs.

18. The computer program product of claim 13, wherein said image is to be resized in a vertical direction, further comprising:

grouping together adjacent seams located between horizontal rows of text in said image document to form Text Line Spacing background seam groups (BSGs);

classifying said Text Line Spacing BSGs based upon their respective overall seam group width; and removing said Text Line Spacing BSGs until said image has been resized to said desired target dimension.

* * * * *